(12) United States Patent
Wu et al.

(10) Patent No.: US 8,259,931 B2
(45) Date of Patent: Sep. 4, 2012

(54) SLIDING MECHANISM AND ELECTRONIC DEVICE HAVING THE SAME

(75) Inventors: Ke-Long Wu, Shenzhen (CN); Chia-Hua Chen, Taipei (TW)

(73) Assignees: Shenzhen Futaihong Precision Industry Co., Ltd., ShenZhen, Guangdong Province (CH); FIH (Hong Kong) Limited, Kowloon (HK)

( * ) Notice: Subject to any disclaimer, the term of this patent is extended or adjusted under 35 U.S.C. 154(b) by 336 days.

(21) Appl. No.: 12/780,043

(22) Filed: May 14, 2010

(65) Prior Publication Data

US 2011/0100993 A1   May 5, 2011

(30) Foreign Application Priority Data

Oct. 30, 2009   (CN) .......................... 2009 1 0309096

(51) Int. Cl.
*H04M 1/00* (2006.01)
*H04M 9/00* (2006.01)
(52) U.S. Cl. ................. 379/433.12; 455/575.4
(58) Field of Classification Search ............. 379/433.11, 379/433.12; 455/575.1, 575.4; 361/679.39, 361/727; 16/284, 326, 327, 328
See application file for complete search history.

(56) References Cited

U.S. PATENT DOCUMENTS

| 2006/0057892 A1* | 3/2006 | Bricaud et al. ............... 439/630 |
| 2007/0032278 A1* | 2/2007 | Lee et al. ................... 455/575.4 |
| 2007/0076861 A1* | 4/2007 | Ju ............................ 379/433.01 |
| 2008/0058039 A1* | 3/2008 | Lee et al. ................... 455/575.4 |

FOREIGN PATENT DOCUMENTS

| CN | 1921509 A | 2/2007 |
| CN | 200997624 Y | 12/2007 |
| CN | 101552809 A | 10/2009 |

* cited by examiner

*Primary Examiner* — Tuan Nguyen
(74) *Attorney, Agent, or Firm* — Altis Law Group, Inc.

(57) ABSTRACT

A sliding mechanism comprises a sliding plate, a main plate, a first slide enabling member and a biasing member. The sliding plate has two angled portions. The main plate has two side walls. The first slide enabling member is coupling the angled portions of the sliding plate to the side walls of the main plate such that the sliding plate is slid relative to the main plate from a closed position or to retract from an open position. The first slide enabling member comprises a set of first roller assembly and a set of first tracks that engage the first roller assembly, when the sliding plate slide relative to the main plate, the first roller assembly are rotated and slid relative to the first tracks. The biasing member biases the sliding plate to slide to the open position when the sliding plate crosses an intermediate position.

20 Claims, 6 Drawing Sheets

SLIDING MECHANISM AND ELECTRONIC DEVICE HAVING THE SAME

BACKGROUND

1. Technical Field

The disclosure generally relates to electronic devices, and particularly to electronic devices having sliding mechanisms.

2. Description of Related Art

A typical slidable portable electronic device, such as a mobile phone, generally includes a cover with a display, a base with a keypad. In addition, a sliding mechanism comprises a retaining plate and a sliding plate slidably mounted to the retaining plate. The cover is mounted to the sliding plate and the base is mounted to the retaining plate, so that the cover can slide relative to the base when the sliding plate moves relative to the retaining plate. However, a large friction force may be created between the sliding plate and the retaining plate when the sliding plate is slid relative to the retaining plate.

Therefore, there is room for improvement within the art

BRIEF DESCRIPTION OF THE DRAWINGS

Many aspects of the exemplary sliding mechanism and an electronic device employing the same can be better understood with reference to the following drawings. The components in the various drawings are not necessarily drawn to scale, the emphasis instead being placed upon clearly illustrating the principles of the exemplary sliding mechanism and an electronic device employing the same. Moreover, in the drawings, like reference numerals designate corresponding parts throughout the diagrams.

DETAILED DESCRIPTION

In this exemplary embodiment, the device is an electronic device such as a mobile telephone. The mobile telephone described herein is a representation of the type of wireless communication device that may benefit from the present invention. However, it is to be understood that the present invention may be applied to any type of hand-held or portable device including, but not limited to, the following devices: radiotelephones, cordless phones, paging devices, personal digital assistants, portable computers, pen-based or keyboard-based handheld devices, remote control units, portable media players (such as an MP3 or DVD player) that have wireless communication capability and the like. Accordingly, any reference herein to the mobile telephone should also be considered to apply equally to other portable wireless electronic devices.

Figure 1:
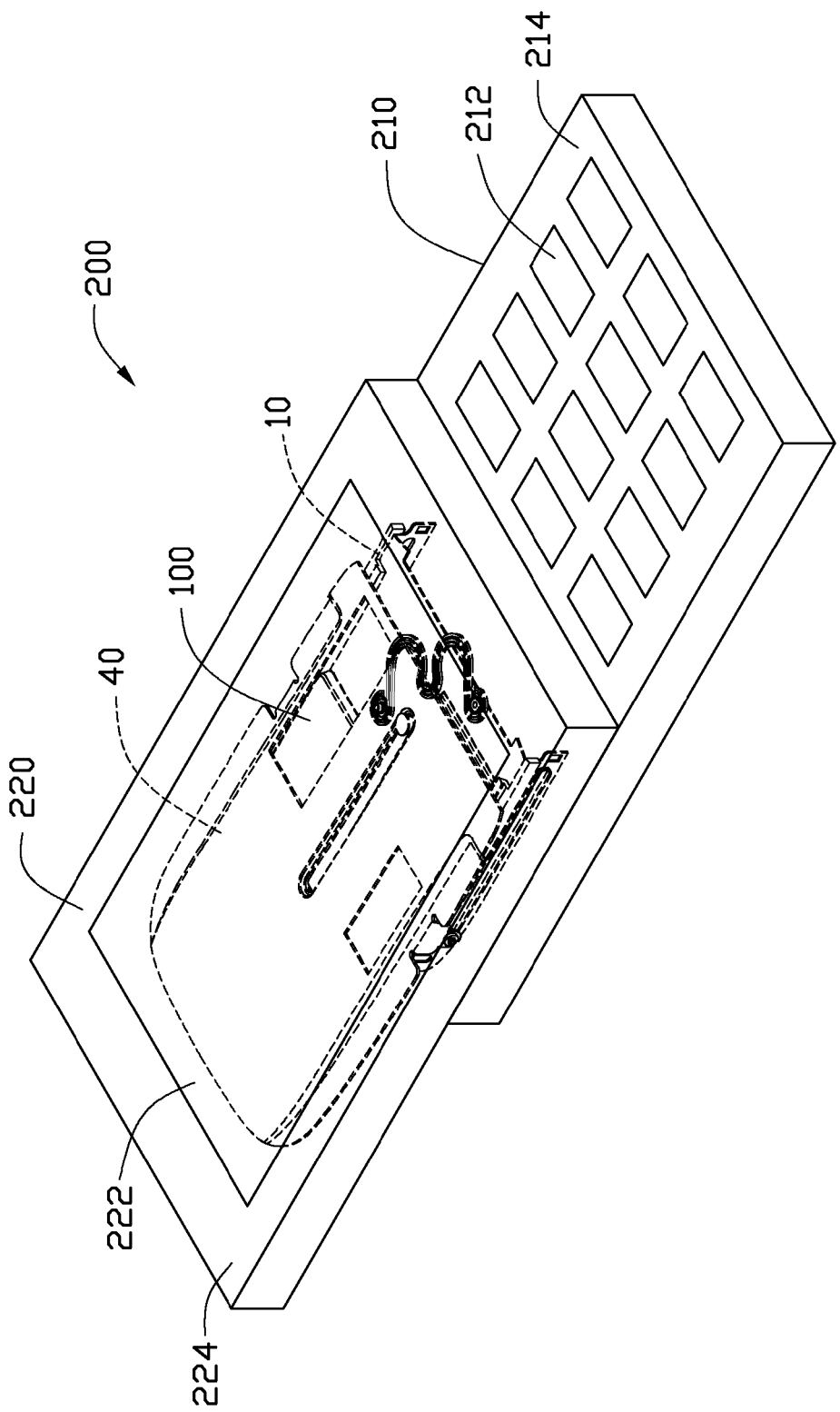
FIG. 1 is a schematic, perspective view of an electronic device employing a sliding mechanism according to an exemplary embodiment, wherein the electronic device is in an open position.

An embodiment of an electronic device 200 incorporating a sliding mechanism 100 is shown in FIG. 1, which illustrates a perspective view of the electronic device 200 in an extended, slid or open position. The electronic device 200, which may be a mobile telephone in this case, includes a first housing 210 and a second housing 220, which are slidably coupled by the sliding mechanism 100. A keypad 212 is mounted to an upper surface 214 of the first housing 210, and a display 222 is mounted on an upper surface 224 of the second housing 220. The second housing 220 can be slid relative to the first housing 210 under the sliding mechanism 100, to expose the keypad 212 for using the device.

Figure 2:
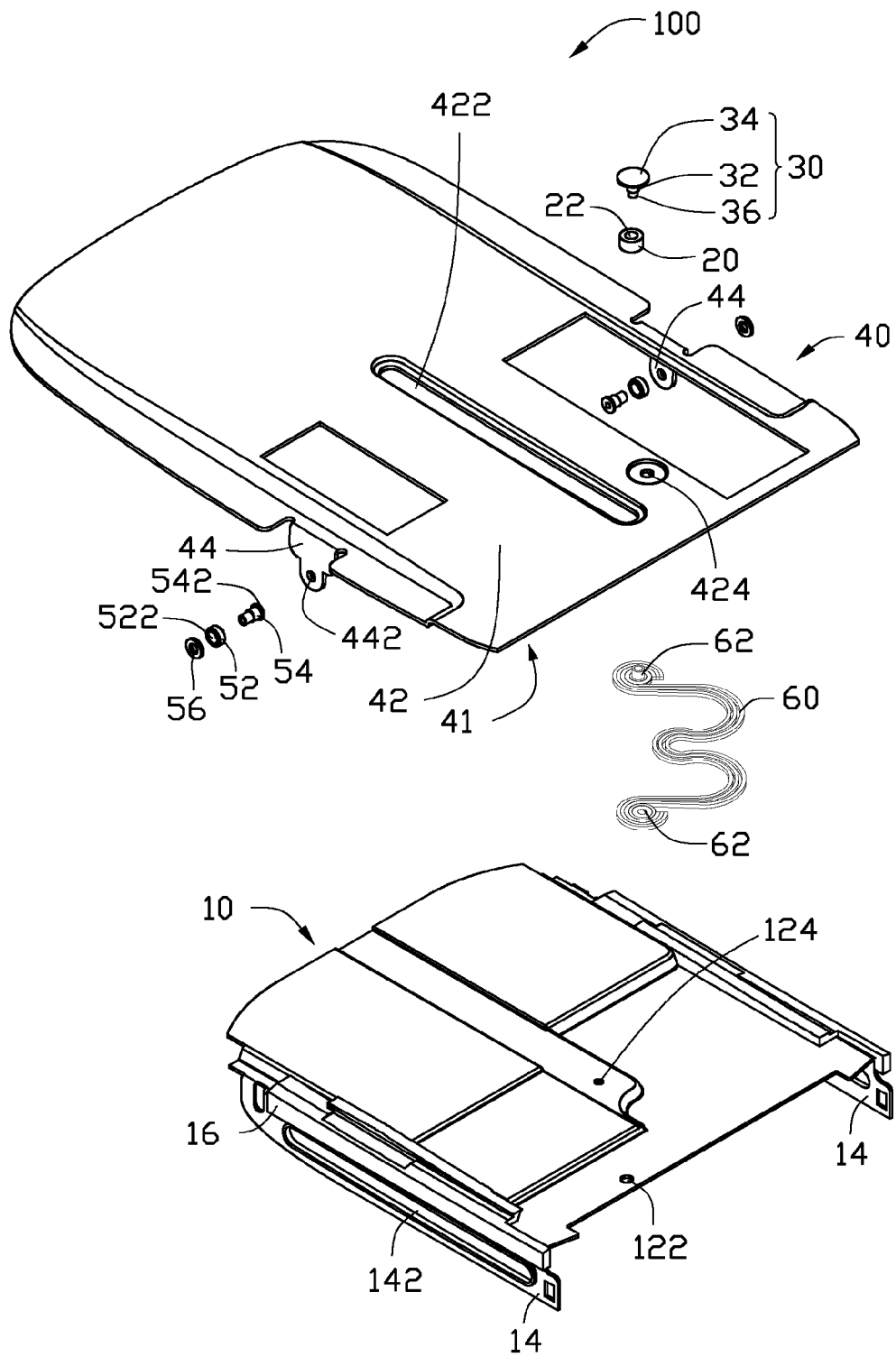
FIG. 2 is an exploded view of the sliding mechanism shown in FIG. 1.
Figure 3:
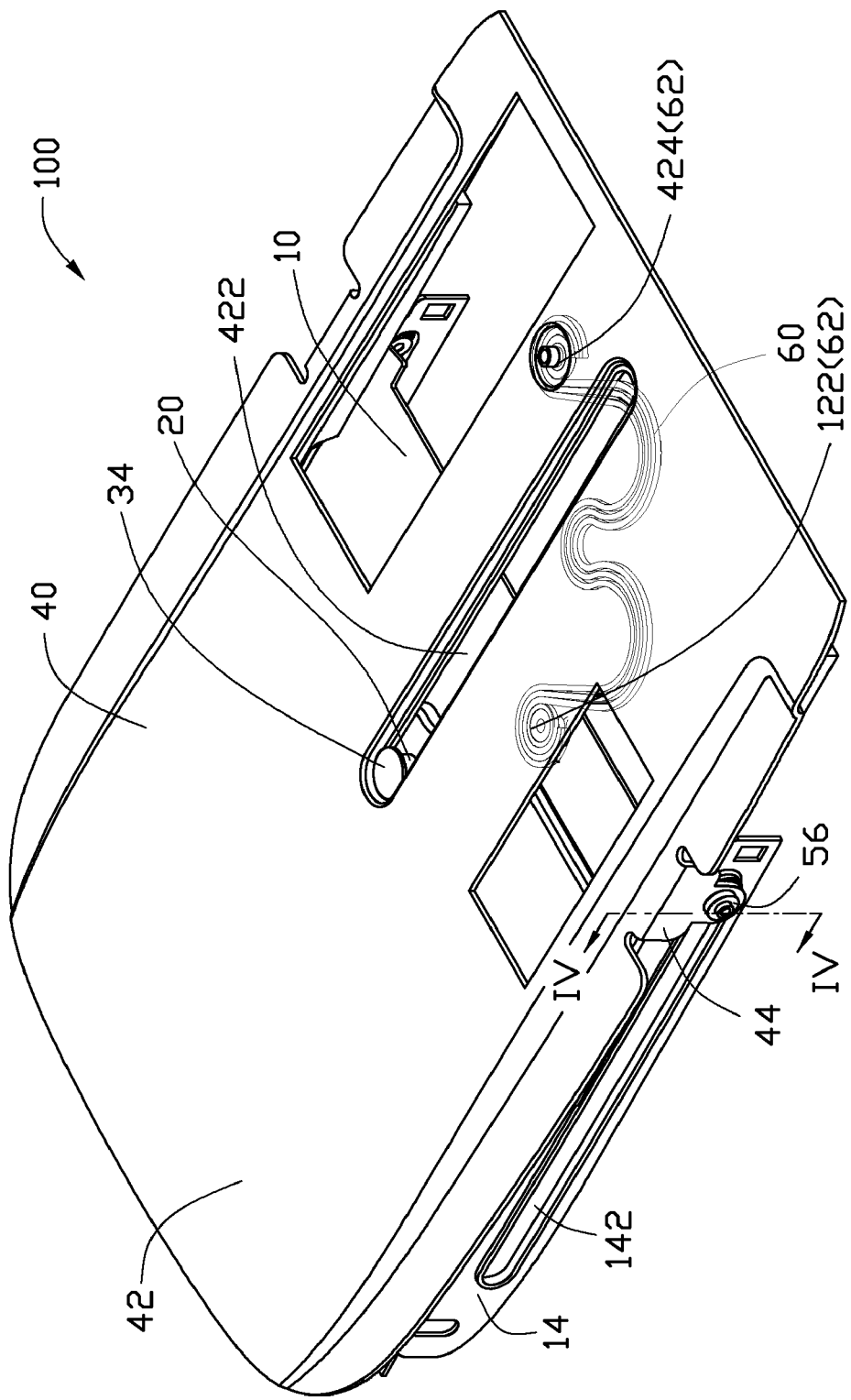
FIG. 3 is an assembled and perspective view of the sliding mechanism shown in FIG. 2, wherein the sliding mechanism is in a closed position.

Referring to FIGS. 2 and 3, the sliding mechanism 100 includes a sliding plate 40 and a main plate 10 which are slidably coupled by a first slide enabling member (not labeled). The sliding plate 40 is mounted to the second housing 220 of the device 200 and the main plate 10 is mounted to the first housing 210 so that the second housing 220 can be slid with the sliding plate 40 with respect to the first housing 210 when the sliding plate 40 slides relative to the main plate 10. The sliding plate 40 has a bottom surface 41 facing the main plate 10, a top surface 42 opposite to the bottom surface 41 and two angled portions 44 respectively located at two opposite sides of the sliding plate 40. The angled portions 44 may be formed by deforming two opposite sides of the sliding plate 40 toward the bottom surface 41, or being protruded from two opposite sides of the sliding plate 40 toward the bottom surface 41. Obviously, the angled portions 44 are angled toward the bottom surface 41 of the sliding plate 40. The main plate 10 has two side walls 14 located at two opposite edges of the main plate 10 corresponding to the angled portions 44 of the sliding plate 40, respectively. When the sliding plate 40 is mounted to the main plate 10, the angled portions 44 are opposite to and adjacent to the side walls 14, correspondingly.

Figure 6:
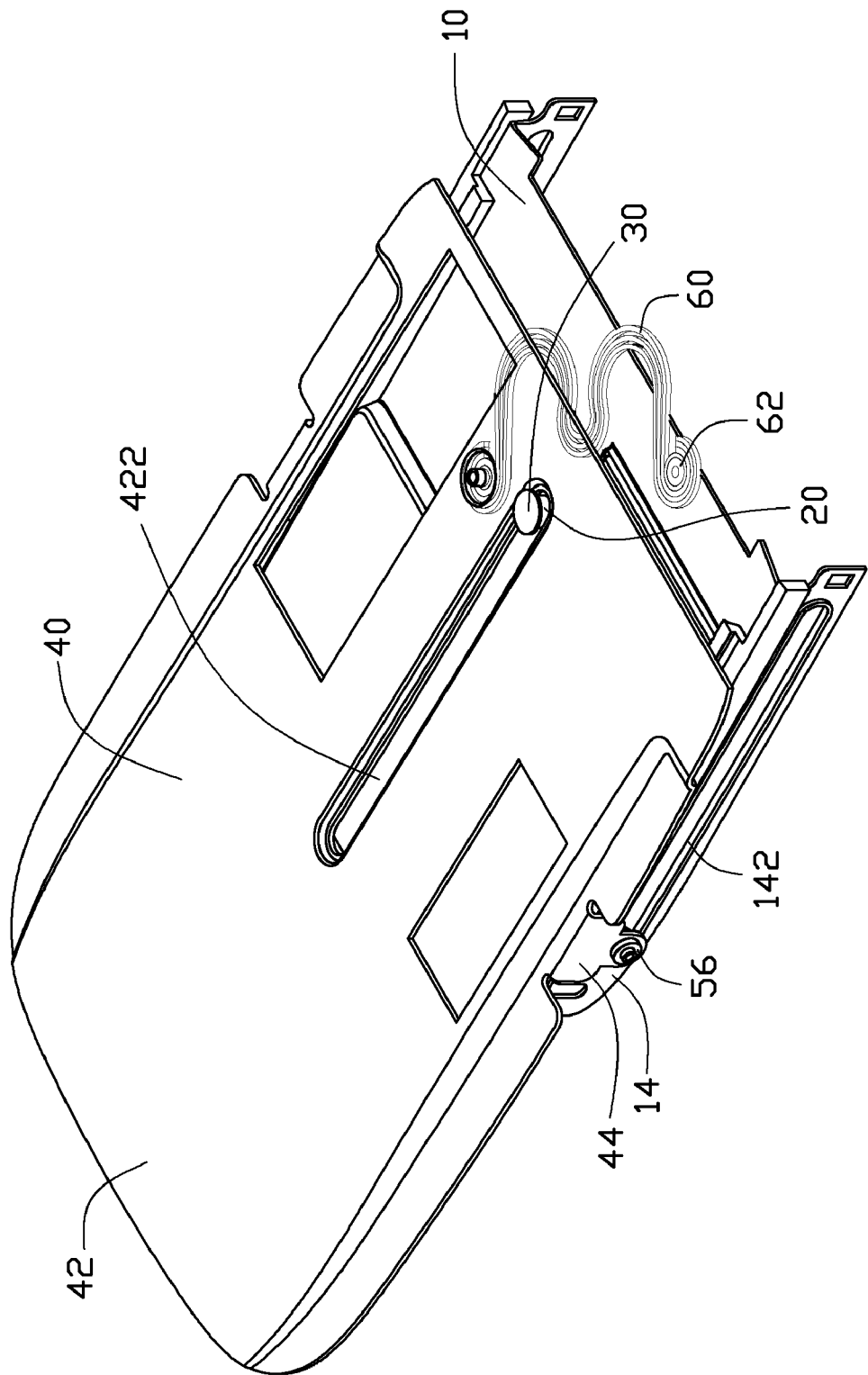
FIG. 6 is similar to FIG. 3, but showing the sliding mechanism in an open position.

The first slide enabling member is coupled between the angled portions 44 of the sliding plate 40 and the side walls 14 of the main plate 10 such that the sliding plate 40 is slidably engaged with the main plate 10. The first slide enabling member, in this embodiment, comprises a first roller assembly 52 and a first tracks 142 that engages the first roller assembly 52. The first roller assembly 52 is positioned in the angled portions 44 of the sliding plate 40 and the first tracks 142 are positioned in the side walls 14 of the main plate 10. The sliding plate 40 slides along the first roller assembly 52 between a closed position shown in FIG. 3 and an open position shown in FIG. 6.

Figure 4:
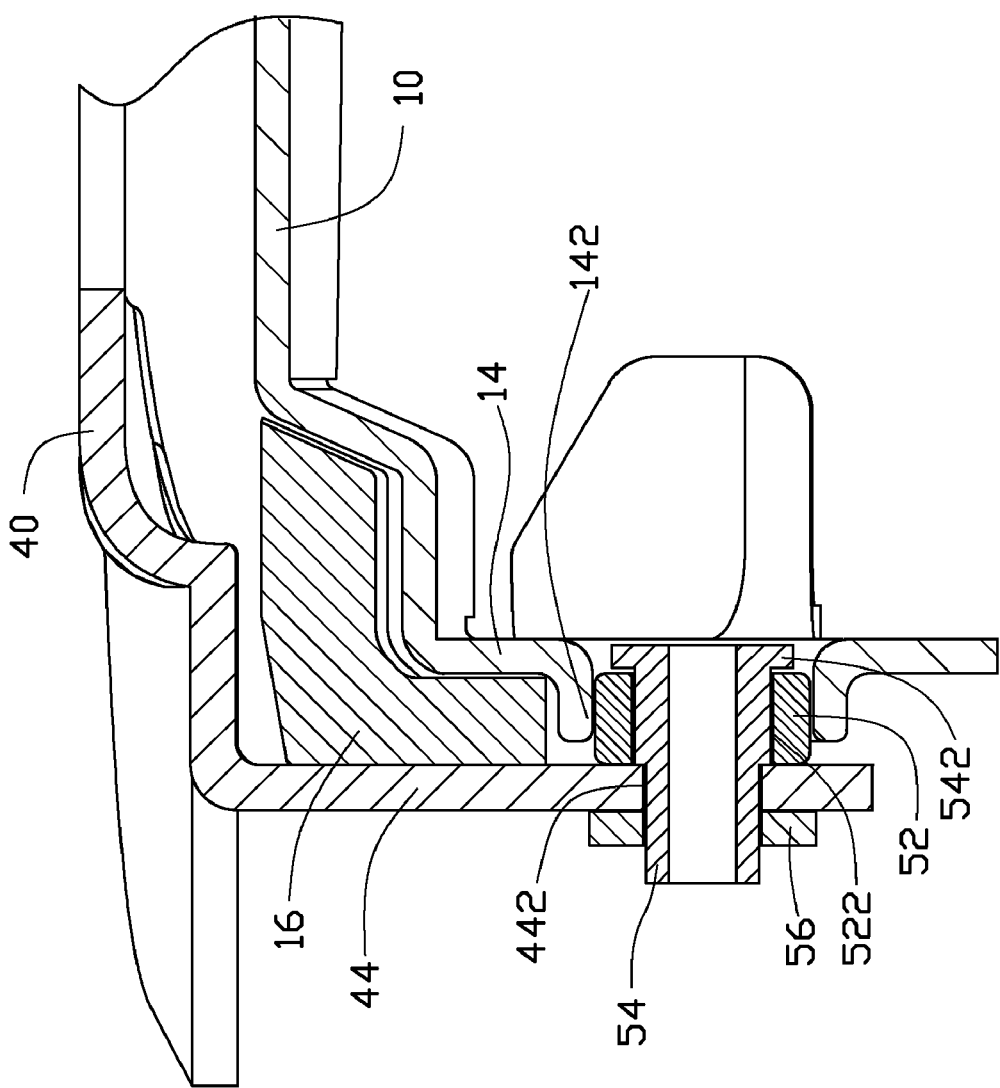
FIG. 4 is a partially enlarged and cross-sectional view of the sliding mechanism shown in FIG. 2 along the line IV-IV.

Referring to FIG. 4, each first rail 52, in this embodiment, includes a hollow roller with an opening 522 defined therethrough, and the first roller assembly 52 is rotatably mounted to the angled portions 44 by two retaining members (not labeled). Each retaining member includes a hole 442 defined in one angled portion 44, a shaft 54 with a flange 524 formed at one end thereof, and a nut 56 screwed on another end of the shaft 54. The first roller assembly 52 may be mounted to the angled portions 44 in such a manner that the first roller assembly 52 are correspondingly located at inner sides of the angled portions 44 with the openings 522 correspondingly aligned with the holes 442 of the angled portions 44, the shafts 54 are correspondingly inserted into the openings 522 and the holes 442 until the flanges 524 resist the first roller assembly 52, then the nuts 56 are retained to the other ends of the shafts 54 opposite to the flanges 524. The openings 522, in this embodiment, are slightly larger than the corresponding shafts 54 such that the first roller assembly 52 can be freely rotated about the shafts 54 when the first roller assembly 52 slide relative to the first tracks 142, thereby the friction created between the first roller assembly 52 and the first tracks 142 can be decreased to improve the operability of the sliding mechanism 100.

Referring to FIGS. 2 and 3, a second slide enabling member (not labeled) may be employed to assist the first slide enabling member so that the sliding plate 40 can be firmly slid relative to the main plate 10. The second slide enabling member, in this embodiment, comprises a second roller assembly 20 and a second track 422 that engages the second roller assembly 20. The second roller assembly 20 is carried on the main plate 10 and the second track 422 is longitudinally carried on the sliding plate 40. The second roller assembly 20 is also a hollow roller with a void 22 defined therethrough, and which is rotatably mounted to the main plate 10 by a retaining member 30 passed through in the void 22. The retaining member 30 is positioned in a retaining trough 124 of the main plate 10 extending into the second track 422. A distal end of the retaining member 30 is wider than the second track 422 such that the retaining member 30 will not pass through the second track 422. As the sliding plate 40 slides relative to the main plate 10, the retaining member 30, and the second track 422 combination prevent the sliding plate 40 and the main plate 10 from separating. The void 22, in this embodiment, is slightly larger than the retaining member 30 such that the second roller assembly 20 can be freely rotated about the retaining member 30 when the second roller assembly 20 slides relative to the second track 422. Thereby the friction created between the second roller assembly 20 and the second track 422 can be decreased to improve the operability of the sliding mechanism 100.

Figure 5:
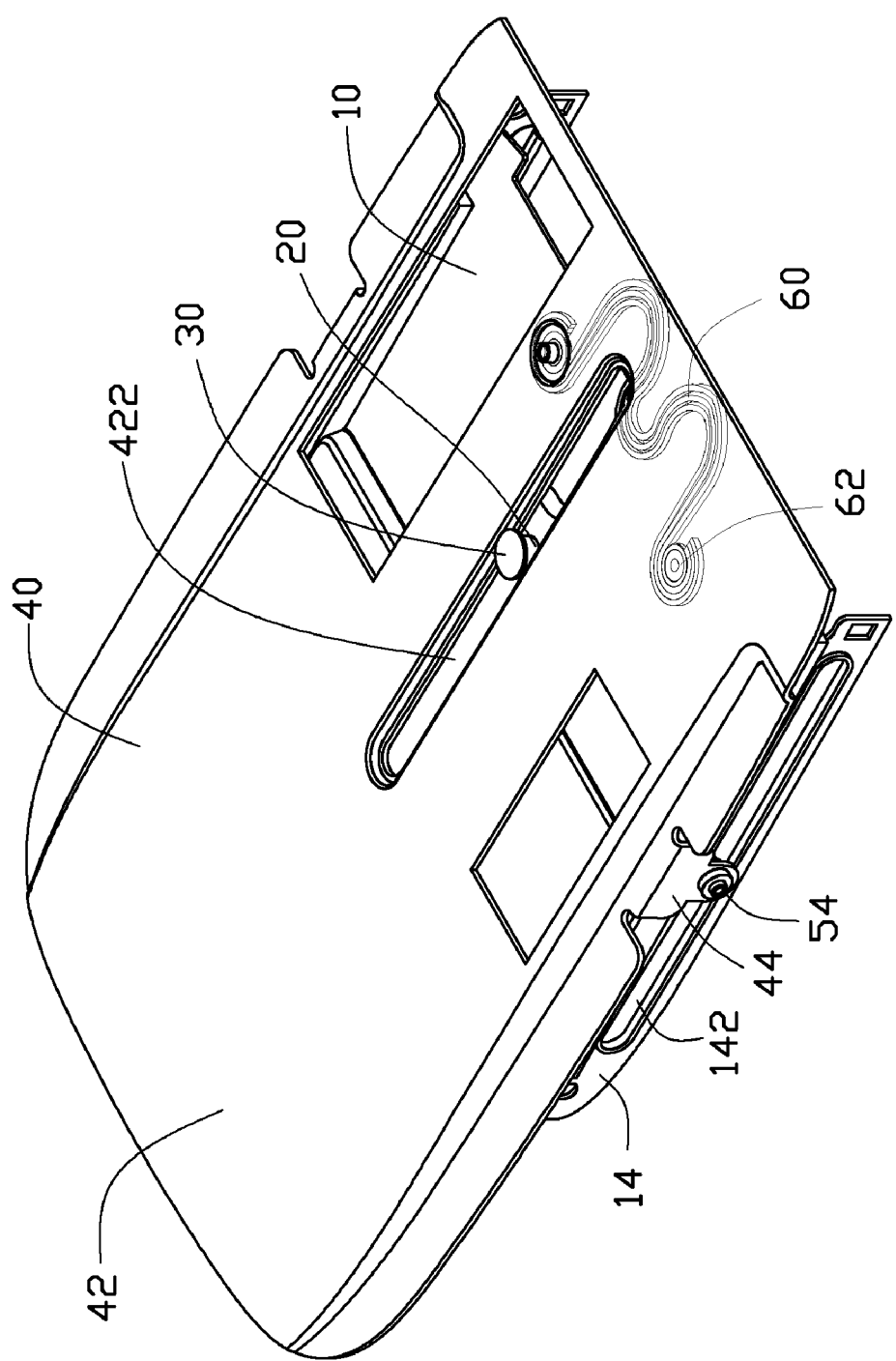
FIG. 5 is similar to FIG. 3, but showing the sliding mechanism in an intermediate position.

Referring to FIGS. 2 and 3, a biasing member 60 is coupled between the sliding plate 40 and the main plate 10. When the sliding plate 40 is slid from the closed position shown in FIG. 2 to an intermediate position shown in FIG. 4, the biasing member 60 is distorted to exert a force on the sliding plate 40 and the main plate 10, once the sliding plate 40 crosses the intermediate position shown in FIG. 4 the sliding plate 40 automatically further slides toward the open position shown in FIG. 5. The biasing member 60 may be a distorted spring, which has two latching portions 62 respectively located at two ends thereof, one latching portion 62 is latched in a latching slot 424 of the sliding plate 40, and the other latching portion 62 is latched in a latching slot 122 of the main plate 10. The biasing member 60 also acts as a stopping member that applies a constant bias force to urge the sliding mechanism 100 to be firmly positioned in the closed position shown in FIG. 2 and the open position shown in FIG. 5.

Referring to FIGS. 2 and 4, the sliding mechanism 100 further includes two buffers 16 located between the side walls of the main plate 10 and the angled portions 44 of the sliding plate 40. The buffers 16 are made of a resilient material, such as rubber. The angled portions 44 are in contact with the buffers 16 instead of being in directly contacted with the main plate 10 when the sliding plate 40 slides relative to the main body 10, to decrease the friction created between the main body 10 and the angled portions 44.

It is to be further understood that even though numerous characteristics and advantages of the exemplary embodiments have been set forth in the foregoing description, together with details of structures and functions of various embodiments, the disclosure is illustrative only, and changes may be made in detail, especially in matters of shape, size, and arrangement of parts within the principles of the exemplary invention to the full extent indicated by the broad general meaning of the terms in which the appended claims are expressed.

What is claimed is:

1. A sliding mechanism, comprising:
   a sliding plate having a bottom surface, and two angled portions respectively located at two opposite sides of the sliding plate, the angled portions angled toward the bottom surface of the sliding plate;
   a main plate having two side walls located at two opposite edges of the main plate corresponding to the angled portions of the sliding plate, respectively;
   a first slide enabling member coupling the angled portions of the sliding plate to the side walls of the main plate such that the sliding plate is slid relative to the main plate from a closed position or to retract from an open position, the first slide enabling member comprising a set of first roller assemblies and a set of first tracks that engage the first roller assemblies, wherein when the sliding plate slide relative to the main plate, the first roller assemblies rotate and slide relative to the first tracks; and
   a biasing member being configured for biasing the sliding plate to slide to the open position when the sliding plate crossing an intermediate position.

2. The sliding mechanism as claimed in claim 1, wherein the first roller assemblies are rotatably positioned in the angled portions of the sliding plate and the first tracks are positioned in the side walls of the main plate.

3. The sliding mechanism as claimed in claim 2, wherein each first roller assembly is a hollow roller with an opening defined therethrough; the first roller assembly rotatably mounted to the angled portions by two retaining members.

4. The sliding mechanism as claimed in claim 3, wherein each retaining member includes a hole defined in one angled portion, a shaft with a flange formed at one end thereof, and a nut screwed on another end of the shaft; the first roller assemblies are correspondingly located at inner sides of the angled portions with the openings correspondingly aligned with the holes of the angled portions, the shafts are correspondingly extended into the openings and the holes until the flanges resist the first roller assemblies, the nuts are retained to the other ends of the shafts opposite to the flanges.

5. The sliding mechanism as claimed in claim 4, wherein the openings are slightly larger than the corresponding shafts such that the first roller assemblies can be freely rotated about the shafts when the first roller assemblies slide relative to the first tracks so as to decrease the friction created between the first roller assemblies and the first tracks.

6. The sliding mechanism as claimed in claim 1, wherein the sliding mechanism further includes a second slide enabling member to assist the first slide enabling member so that the sliding plate be firmly slid relative to the main plate.

7. The sliding mechanism as claimed in claim 6, wherein the second slide enabling member comprises a second roller assembly and a second track that engages the second roller assembly; the second roller assembly is rotatably carried on the main plate and the second track is longitudinally carried on the sliding plate.

8. The sliding mechanism as claimed in claim 7, wherein the second roller assembly is a hollow roller with a void defined therethrough, and the second roller assembly is rotatably mounted to the main plate by a retaining member.

9. The sliding mechanism as claimed in claim 8, wherein the retaining member passes through the void of the second roller assembly and is positioned in a retaining trough of the main plate extending into the second track.

10. The sliding mechanism as claimed in claim 9, wherein a distal end of the retaining member is wider than the second track such that the retaining member is retained in the second track; as the sliding plate slides relative to the main plate, the retaining member/second track combination prevent the sliding plate and the main plate from separating.

11. The sliding mechanism as claimed in claim 9, wherein the void is slightly larger than the retaining member such that the second roller assembly can be freely rotated about the retaining member when the second roller assembly slides relative to the second track so as to decrease the friction created between the second roller assembly and the second track.

12. The sliding mechanism as claimed in claim 1, wherein the biasing member is a distort spring which has two latching portions respectively located at two ends thereof; one of the latching portions is latched to the sliding plate, and the other of the latching portions is latched to the main plate.

13. The sliding mechanism as claimed in claim 1, wherein the sliding mechanism further includes two buffers located between the side walls of the main plate and the angled portions of the sliding plate.

14. An electronic device, comprising:
a first housing;
a second housing; and
a sliding mechanism, comprising:
 a sliding plate being mounted to the second housing, the sliding plate having a bottom surface, and two angled portions located at two opposite sides of the sliding plate, the angled portions angled toward the bottom surface of the sliding plate;
 a main plate being mounted to the first housing, the main plate having two side walls located at two opposite edges of the main plate corresponding to the angled portions of the sliding plate, respectively;
 a first slide enabling member coupling the angled portions of the sliding plate to the side walls of the main plate such that the sliding plate being slid relative to the main plate from a closed position or to retract from an open position, the first slide enabling member comprising a set of first roller assembly and a set of first tracks that engage the first roller assembly, wherein when the sliding plate slide relative to the main plate, the first roller assembly rotatably engage the first tracks; and
 a biasing member being configured for biasing the sliding plate to slide to the open position when the sliding plate crossing an intermediate position.

15. The electronic device as claimed in claim 14, wherein the first roller assembly are rotatably positioned in the angled portions of the sliding plate and the first tracks are positioned in the side walls of the main plate.

16. The electronic device as claimed in claim 15, wherein each first rail is a hollow roller with an opening defined therethrough; the first roller assembly are rotatably mounted to the angled portions by two retaining members.

17. The electronic device as claimed in claim 16, wherein each retaining member includes a hole defined in one angled portion, a shaft with a flange formed at one end thereof, and a nut screwed on another end of the shaft; the first roller assembly are correspondingly located at inner sides of the angled portions with the openings correspondingly aligned with the holes of the angled portions, the shafts are correspondingly extended into the openings and the holes until the flanges resist the first roller assembly, the nuts are retained to the other ends of the shafts opposite to the flanges.

18. The electronic device as claimed in claim 17, wherein the openings are slightly larger than the corresponding shafts such that the first roller assembly can be freely rotated about the shafts when the first roller assembly slide relative to the first tracks, to decrease the friction created between the first roller assembly and the first tracks.

19. A sliding mechanism, comprising:
 a main plate having a set of tracks located at two opposite edges thereof, respectively;
 a sliding plate slidably mounted to the main plate, the sliding plate having a sets of roller assembly rotatably and respectively mounted two sides thereof, the roller assembly engaging with the tracks, wherein the roller assembly are rotated when the roller assembly slide relative to the tracks; and
 a biasing member coupled between the sliding plate and the main plate, wherein when the sliding plate is slid from a closed position to an intermediate position, the biasing member is distorted to exerts a force on the sliding plate and the main plate, causing the sliding plate automatically to slide toward an open position once the sliding plate crosses the intermediate position.

20. The electronic device as claimed in claim 19, wherein the biasing member is a distort spring.

* * * * *